(12) United States Patent
Koizumi (10) Patent No.: US 11,796,352 B2
(45) Date of Patent: Oct. 24, 2023

(54) OPTICAL FIBER SENSOR AND BRILLOUIN FREQUENCY SHIFT MEASUREMENT METHOD

(71) Applicant: Oki Electric Industry Co., Ltd., Tokyo (JP)

(72) Inventor: Kengo Koizumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 17/967,321

(22) Filed: Oct. 17, 2022

(65) Prior Publication Data
US 2023/0288232 A1 Sep. 14, 2023

(51) Int. Cl.
*G01D 5/353* (2006.01)

(52) U.S. Cl.
CPC ................. *G01D 5/35364* (2013.01)

(58) Field of Classification Search
CPC .................................................. G01D 5/35364
See application file for complete search history.

(56) References Cited

U.S. PATENT DOCUMENTS

| | | | |
|---|---|---|---|
| 9,983,094 B2* | 5/2018 | Lecoeuche | G01M 11/3181 |
| 10,066,973 B2* | 9/2018 | Horiguchi | G02B 27/283 |
| 2016/0290857 A1 | 10/2016 | Koizumi | |
| 2019/0094082 A1 | 3/2019 | Koizumi et al. | |

FOREIGN PATENT DOCUMENTS

| | | |
|---|---|---|
| JP | 2016-191659 A | 11/2016 |
| JP | 2019-060743 A | 4/2019 |

OTHER PUBLICATIONS

T. Kurashima et al., "Brillouin Optical-Fiber Time Domain Reflectometry", IEICE Trans. Commun., vol. E76-B, No. 4, pp. 382-390, Apr. 1993.

* cited by examiner

*Primary Examiner* — Seung C Sohn
(74) *Attorney, Agent, or Firm* — Rabin & Berdo, P.C.

(57) ABSTRACT

To uniquely determine a Brillouin frequency shift (BFS) even if a relation between phase and intensity of an intensity signal corresponding to a phase difference between the two optical paths in an interferometer varies. An optical fiber sensor includes a reference section average value calculation unit 180 configured to acquire average intensity in a reference section, a phase control unit 142 configured to control a delay unit in such a manner that a phase difference between two optical paths is swept from 0 to $2\pi$, a Brillouin scattering coefficient elimination unit 176 configured to eliminate a Brillouin scattering coefficient from an interference signal by using an intensity signal, a phase/amplitude calculation unit 184 configured to acquire an initial phase $\varphi_{offset}$ and amplitude of the interference signal by using a relation between average intensity $I_{ave}$ and the phase obtained through the phase sweep from 0 to $2\pi$, a normalization unit 179 configured to use the amplitude of the interference signal to normalize the interference signal from which the Brillouin scattering coefficient is eliminated, and a BFS computation unit 188 configured to compute a BFS by using the normalized interference signal.

4 Claims, 6 Drawing Sheets

OPTICAL FIBER SENSOR AND BRILLOUIN FREQUENCY SHIFT MEASUREMENT METHOD

CROSS REFERENCE TO RELATED APPLICATION(S)

This application is based upon and claims benefit of priority from Japanese Patent Application No. 2022-036860, filed on Mar. 10, 2022, the entire contents of which are incorporated herein by reference.

BACKGROUND

The present invention related to an optical fiber sensor and a Brillouin frequency shift measurement method.

With the evolution of optical fiber communication, distributed optical fiber sensing, in which the optical fiber itself serves as a sensing medium, has become an active area of research. In particular, different from an electric sensor that performs measurement for each point, optical fiber sensing that uses scattered light is capable of sensing as long-distance distribution. Accordingly, the optical fiber sensing allows the physical quantity of the entire measurement target to be measured.

Representative distributed optical fiber sensing capable of sensing as long-distance distribution is optical time domain reflectometry (OTDR), in which optical pulses are incident on an optical fiber from one end of the optical fiber, and light backscattered within the optical fiber is measured with respect to time. Backscattering in an optical fiber includes Rayleigh scattering, Brillouin scattering, and Raman scattering. Among others, OTDR that measures spontaneous Brillouin scattering is referred to as Brillouin OTDR (BOTDR) (see, for example, T. Kurashima et al., "Brillouin Optical-fiber time domain reflectometry", IEICE Trans. Commun., vol. E76-B, no. 4, pp. 382-390 (1993)).

Brillouin scattering is observed at positions with the frequency shift of the order of GHz on Stokes and anti-Stokes sides with respect to the center frequency of the optical pulse incident on the optical fiber. The spectrum of Brillouin scattering is referred to as the Brillouin gain spectrum (BGS). The frequency shift and the spectral line width of the BGS are referred to as Brillouin frequency shift (BFS) and Brillouin line width, respectively. The BFS and the Brillouin line width vary depending on the material of the optical fiber and the wavelength of incident light. For example, in the case of a silica-based single-mode optical fiber, it is reported that the magnitude of the BFS and the Brillouin line width for a wavelength of 1.55 m are approximately 11 GHz and approximately 30 MHz, respectively. In addition, according to T. Kurashima et al., "Brillouin Optical-fiber time domain reflectometry", IEICE Trans. Commun., vol. E76-B, no. 4, pp. 382-390 (1993), the magnitudes of the BFS associated with strain and a temperature change inside a single-mode fiber are 0.049 MHz/$\mu\varepsilon$ and 1.0 MHz/° C., respectively, for a wavelength of 1.55 $\mu$m.

Here, the BFS has dependency on strain and temperature. Therefore, BOTDR has been attracting attention because BOTDR is usable for the purpose of diagnosing deterioration of large constructions represented by bridges, tunnels and the like, monitoring temperature of plants, monitoring potential areas of landslide occurrence, or the like.

BOTDR generally performs heterodyne detection to measure the spectrum waveform of spontaneous Brillouin scattered light caused in an optical fiber with the use of reference light prepared separately. The intensity of spontaneous Brillouin scattered light is lower than the intensity of Rayleigh scattered light by two through three orders of magnitude. Therefore, heterodyne detection is also useful in increasing the minimum light reception sensitivity.

Here, even the application of heterodyne detection does not offer a sufficient signal-to-noise ratio (S/N) as spontaneous Brillouin scattered light is very weak. As a result, an averaging process is necessary to improve S/N. A conventional optical fiber strain measurement apparatus that performs BOTDR acquires three-dimensional information of time, amplitude, and frequency. The averaging process and the acquisition of this three-dimensional information, however, make it difficult to shorten measurement time.

For this, the inventors of the present application have proposed an optical fiber strain measurement apparatus and an optical fiber strain measurement method that use self-delayed heterodyne BOTDR (SDH-BOTDR) (see, for example, JP 2016-191659A). The SDH-BOTDR compares phases between a received beat signal and a local signal, and observes change in BFS as phase variation in the beat signal. As described above, the SDH-BOTDR is capable of directly calculating the BFS without frequency sweep. This makes it possible to achieve fast and inexpensive measurement.

In addition, the inventors of the present application have also proposed an optical fiber strain measurement apparatus and an optical fiber strain measurement method that use self-delayed homodyne BOTDR as a self-delayed interferometer (see, for example, JP 2019-060743A). The self-delayed homodyne BOTDR has a simpler structure and offers an improved S/N and improved space resolution.

SUMMARY

Here, when using the technology related to the self-delayed heterodyne disclosed in JP 2016-191659A, a beat signal of any frequency serves as a reception signal. Therefore, it is easy to compare phases through digital signal processing and to calculate Brillouin scattering intensity or the like through envelope detection.

On the other hand, when using the technology related to the self-delayed homodyne, an intensity signal corresponding to a phase difference between two optical paths in an interferometer is output. The relation between phase and intensity is not constant, but varies depending on an S/N of input Brillouin scattered light, conversion efficiency of a light receiving element, and the like. Therefore, the relation between phase and intensity is underspecified.

The present invention is made in view of the aforementioned issues. An object of the present invention is to provide a self-delayed homodyne optical fiber sensor and Brillouin frequency shift measurement method that compute a BFS by acquiring a relation between phase and intensity.

To achieve the above object, an optical fiber sensor according the present invention includes a light source unit configured to generate probe light, a splitting unit configured to split Brillouin backscattered light into two scattered light beams, the Brillouin backscattered light occurring in an optical fiber to be measured with the probe light, an interference signal acquisition unit configured to receive one of the two scattered light beams split by the splitting unit, and generate an interference signal through self-delayed homodyne interference, an intensity acquisition unit configured to receive another one of the two scattered light beams split by the splitting unit, and generate an intensity signal indicating intensity of the scattered light, and a Brillouin frequency shift acquisition unit configured to acquire a Brillouin frequency shift amount from the interference signal and the intensity signal.

The interference signal acquisition unit includes a self-delayed homodyne interferometer having a splitting unit configured to split the received scattered light beam into two branches including a first optical path and a second optical path, a delay unit provided in the first optical path and configured to change a phase of the scattered light in response to an instruction from the Brillouin frequency shift acquisition unit, and a multiplexer unit configured to multiplex light received through the first optical path and light received through the second optical path to generate interfering light, and an interfering light reception unit configured to convert the interfering light into an electrical signal to generate an interference signal, and the Brillouin frequency shift acquisition unit includes a reference section average value calculation unit configured to acquire average intensity of the interference signal in a preset reference section, a phase control unit configured to control the delay unit in such a manner that the phase of the scattered light propagating through the first optical path is swept from 0 to $2\pi$, a Brillouin scattering coefficient elimination unit configured to eliminate a Brillouin scattering coefficient from the interference signal by using the intensity signal, a phase/amplitude calculation unit configured to acquire a relation between the phase and average intensity $I_{ave}$ of the interference signal in the reference section from the average intensity $I_{ave}$ obtained through the phase sweep from 0 to $2\pi$, and acquire an initial phase $\varphi_{offset}$ that defines a measurement range of a Brillouin frequency shift and amplitude of the interference signal on a basis of the relation, a normalization unit configured to use the amplitude of the interference signal to normalize the interference signal from which the Brillouin scattering coefficient is eliminated, and a Brillouin frequency shift computation unit configured to compute the Brillouin frequency shift by using the normalized interference signal.

According to a preferred embodiment of the optical fiber sensor according the present invention, the phase control unit is capable of controlling the phase obtained in the delay unit in such a manner that the average intensity $I_{ave}$ in the reference section becomes consistent with initial intensity $I_{offset}$ corresponding to the initial phase $\varphi_{offset}$.

Also, a Brillouin frequency shift measurement method according the present invention includes generating probe light, splitting Brillouin backscattered light into two scattered light beams, the Brillouin backscattered light occurring in an optical fiber to be measured with the probe light, splitting one of the two split scattered light beams into two branches including a first optical path and a second optical path, delaying scattered light propagating through the first optical path, multiplexing the scattered light propagating through the first optical path and scattered light propagating through the second optical path to generate interfering light, performing photoelectric conversion on the interfering light to generate an interference signal that is an electrical signal, acquiring an intensity signal indicating scattered light intensity from another one of the two scattered light beams obtained by splitting the Brillouin backscattered light, and acquiring a Brillouin frequency shift from the interference signal and the intensity signal. Calibration measurement is performed before usual measurement, and the calibration measurement includes acquiring a relation between phase and average intensity $I_{ave}$ of the interference signal in a reference section from the average intensity $I_{ave}$ obtained through phase sweep from 0 to $2\pi$, acquiring an initial phase $\varphi_{offset}$ that defines a measurement range of a Brillouin frequency shift and amplitude of the interference signal on a basis of the relation, and setting a phase obtained in a delay unit to the initial phase $\varphi_{offset}$.

According to a preferred embodiment of the Brillouin frequency shift measurement method according the present invention, in the usual measurement, a phase of the scattered light propagating through the first optical path is controlled in such a manner that the average intensity in the reference section becomes consistent with initial intensity $I_{offset}$ corresponding to the initial phase $\varphi_{offset}$.

When using the optical fiber sensor and the Brillouin frequency shift measurement method according to the present invention, it is possible to uniquely determine the BFS by acquiring a relation between a phase of light propagating through one of the optical paths in the interferometer and average intensity in a reference section. In addition, even if a relation between phase and intensity of an intensity signal corresponding to a phase difference between the two optical paths in the interferometer varies depending on the S/N of input Brillouin scattered light, conversion efficiency of a light receiving element, and the like, it is possible to compute a correct BFS by performing feedback control over the phase of the scattered light in such a manner that the average intensity in the reference section becomes consistent with initial intensity $I_{offset}$ corresponding to an initial phase $\varphi_{offset}$.

DETAILED DESCRIPTION OF THE EMBODIMENT(S)

With reference to the drawings, the following describes embodiments of the present invention, but each diagram is merely illustrated so schematically that the present invention can be understood. In addition, the following describes a preferable configuration example of the present invention, but it is a mere preferable example. Thus, the present invention is not limited to the following embodiments. A large number of changes or modifications that can attain the advantageous effects of the present invention can be made without departing from the configuration scope of the present invention. It should be noted that, in this specification and the appended drawings, structural elements that have substantially the same function and structure are denoted with the same reference signs, and repeated explanation thereof is omitted.

Principle of Present Embodiment

First, an optical fiber sensor that uses self-delayed homodyne BOTDR (hereinafter, also referred to as a self-delayed homodyne sensor) will be described with reference to FIG. 1 and FIG. 2.

Figure 1:
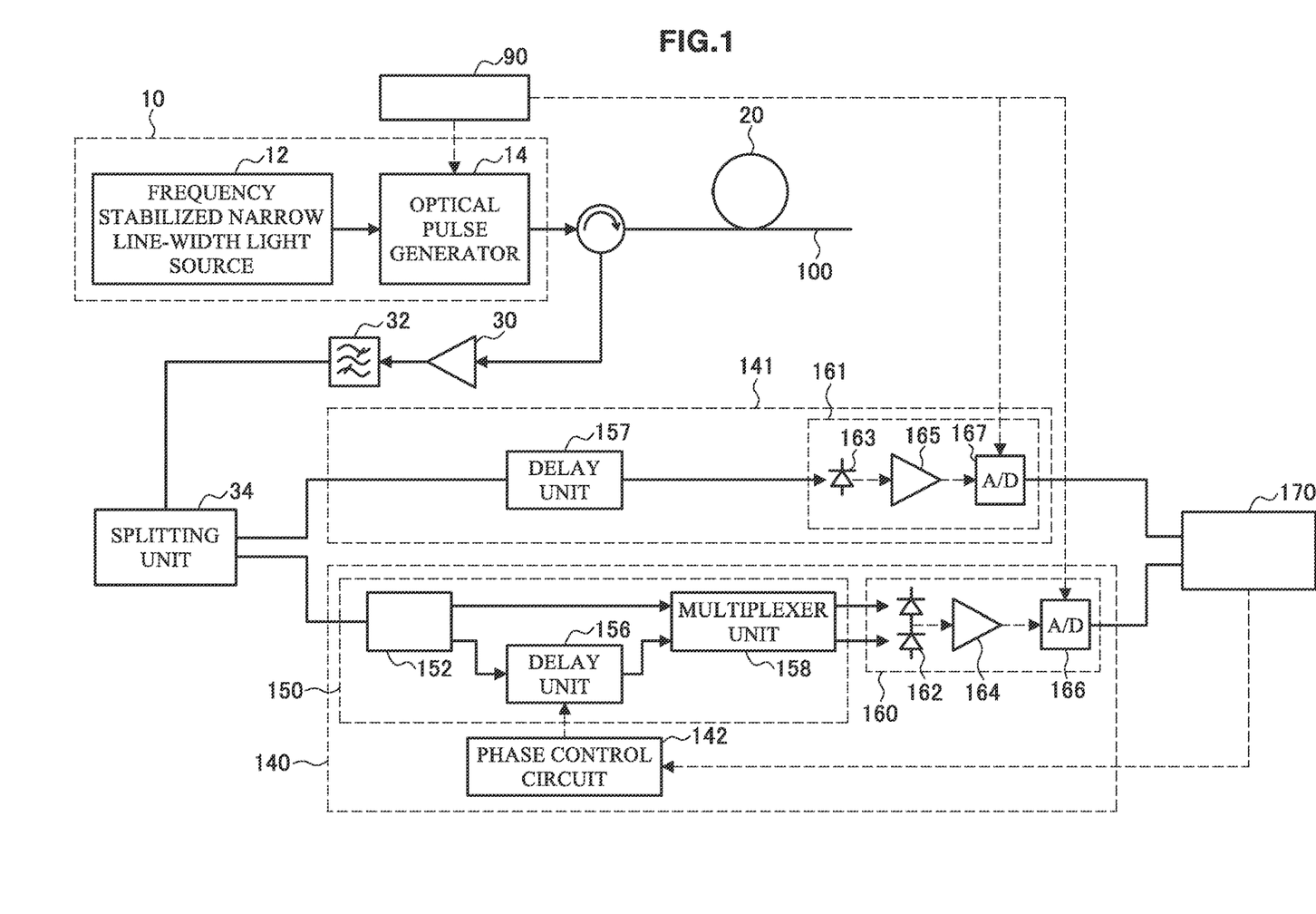
FIG. 1 is a block diagram schematically illustrating a self-delayed homodyne sensor.
Figure 2:
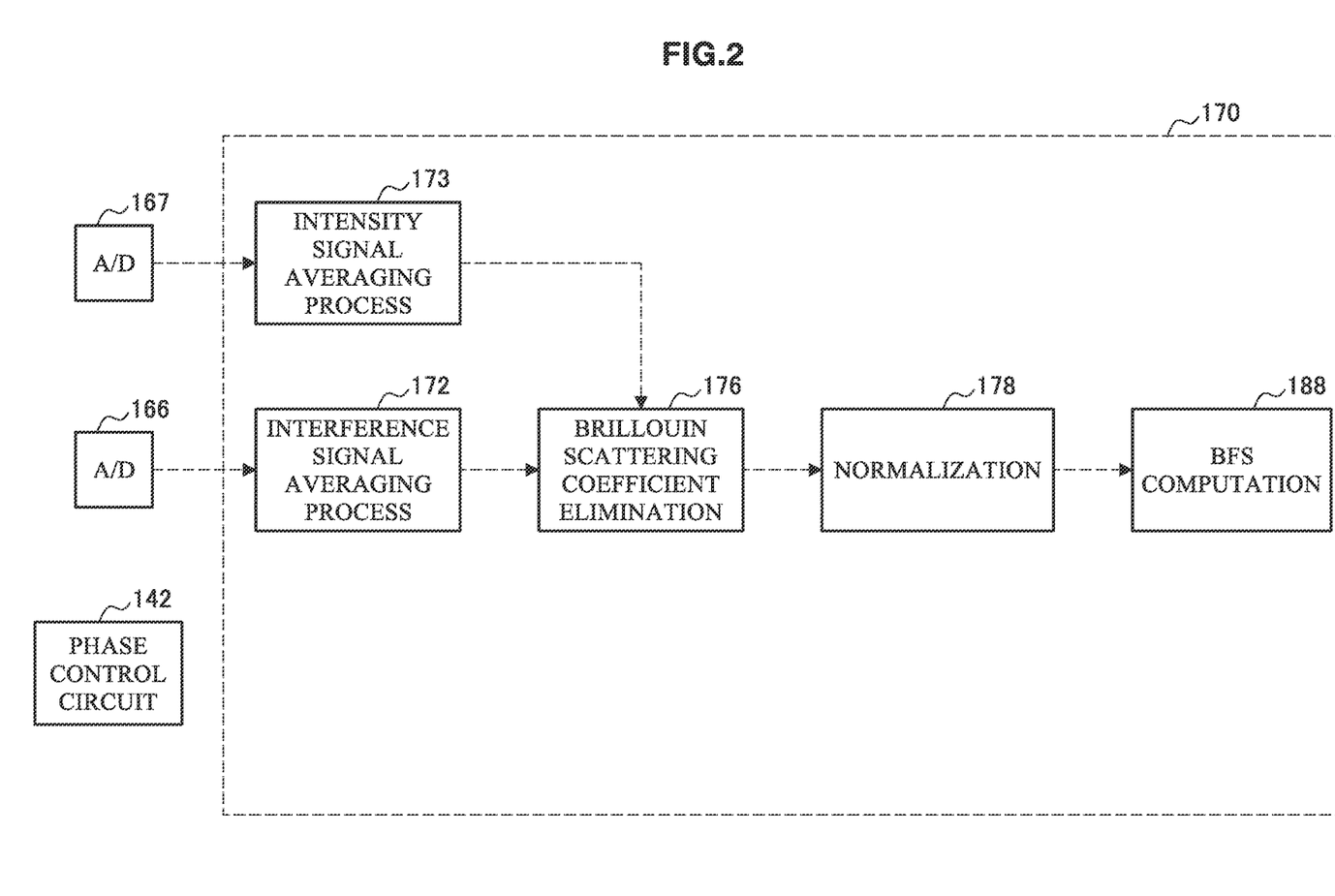
FIG. 2 is a block diagram schematically illustrating a BFS acquisition unit of the self-delayed homodyne sensor.

FIG. 1 is a block diagram schematically illustrating a self-delayed homodyne sensor according to this embodiment. FIG. 2 is a block diagram schematically illustrating a BFS acquisition unit of the self-delayed homodyne sensor.

The self-delayed homodyne sensor includes a light source unit 10, a circulator 20, an optical amplifier 30, an optical bandpass filter 32, a splitting unit 34, an interference signal acquisition unit 140, an intensity acquisition unit 141, a BFS acquisition unit 170, and a timing controller 90.

The light source unit 10 generates probe light. The light source unit 10 includes a light source 12 configured to generate continuous light and an optical pulse generator 14 configured to generate optical pulses from the continuous light.

Here, the self-delayed homodyne sensor measures a phase difference corresponding to a frequency change. Therefore, frequency fluctuations and frequency spectral line width (hereinafter, also simply referred to as line width) of the light source 12 need to be sufficiently smaller than a Brillouin frequency shift. Thus, a frequency stabilized narrow linewidth light source is used as the light source 12. For example, when an optical fiber 100 serving as a measurement target (hereinafter, also referred to as a measurement target optical fiber) has a strain of 0.008%, the corresponding Brillouin frequency shift is 4 MHz. Therefore, to measure a strain of approximately 0.008%, it is preferable that the frequency fluctuation and the line width of the light source 12 is sufficiently smaller than 4 MHz, and equal to or less than several tens of kHz. Note that, narrow line width lasers that have frequency fluctuation and line width equal to or less than approximately ten kHz are commercially available as ready-made product.

The optical pulse generator 14 is implemented as any suitable conventionally well-known acousto-optical (AO) modulator or electrooptical (EO) modulator. The optical pulse generator 14 generates rectangular optical pulses from continuous light in response to electrical pulses generated by the timing controller 90. The repetition period of the optical pulses is set longer than the round trip time for an optical pulse along the measurement target optical fiber 100. The optical pulses are output as the probe light from the light source unit 10.

The probe light output from the light source unit 10 enters the measurement target optical fiber 100 via the circulator 20. Note that an optical coupler may be used instead of the circulator 20.

Backscattered light from the measurement target optical fiber 100 is transmitted to the optical amplifier 30 which is implemented as, for example, an erbium-doped optical fiber amplifier (EDFA) or the like via the circulator 20. The backscattered light amplified by the optical amplifier 30 is transmitted to the optical bandpass filter 32. The optical bandpass filter 32 has a passband of approximately 10 GHz and passes only spontaneous Brillouin scattered light. An expression (1) listed below represents an electric field $E_{B0}$(t), at time t, of the spontaneous Brillouin scattered light emitted from the optical bandpass filter 32.

$$E_{B0}(t) = A_{B0}\eta_B(t)\exp\{j(2\pi f_B(t)t + \varphi_{B0})\} \quad (1)$$

In the expression, $A_{B0}$ is amplitude, $\eta_B(t)$ is a Brillouin scattering coefficient, $f_B(t)$ is an optical frequency of the Brillouin scattered light, and $\varphi_{B0}$ is an initial phase. Note that the Brillouin scattering coefficient $\eta_B(t)$ and the optical frequency $f_B(t)$ of the Brillouin scattered light vary depending on local strain and temperature change in the optical fiber and thus are expressed as a function of time t. In addition, here, for ease of explanation, losses in the measurement target optical fiber 100 are ignored.

Light passed through the optical bandpass filter 32 is transmitted to the splitting unit 34. The splitting unit 34 splits the light passed through the optical bandpass filter 32 into two scattered light beams, transmits one of the scattered light beams to the interference signal acquisition unit 140, and transmits the other of the scattered light beams to the intensity acquisition unit 141.

The interference signal acquisition unit 140 includes a self-delayed homodyne interferometer 150, an interfering light reception unit 160, and a phase control circuit 142. In addition, the self-delayed homodyne interferometer 150 includes a splitting unit 152, a delay unit 156, and a multiplexer unit 158. The splitting unit 152 and the multiplexer unit 158 may be implemented as any suitable conventionally well-known optical coupler.

The splitting unit 152 splits the light transmitted to the interference signal acquisition unit 140 into two branches including a first optical path and a second optical path.

In this configuration example, the delay unit 156 is provided in the first optical path. The delay unit 156 delays light propagating through the first optical path, by delay time τ. In addition, the delay unit 156 is capable of change the phase of the propagating light in response to an instruction from the phase control circuit 142.

The multiplexer unit 158 multiplexes the light propagating through the first light path and the light propagating through the second light path to generate multiplexed light. An expression (2) and an expression (3) listed below respectively represent an optical signal $E_{B1}$(t) propagating through the first optical path and an optical signal $E_{B2}$(t−τ) propagating through the second optical path that are incident on the multiplexer unit 158.

$$E_{B1}(t) = A_{B1}\eta_B(t)\exp\{j(2\pi f_B(t)t + \varphi_{B1})\} \quad (2)$$

$$E_{B2}(t-\tau) = A_{B2}\eta_B(t)\exp[j\{2\pi f_B(t)(t-\tau) + \varphi_{B2}\}] \quad (3)$$

In the expressions, $A_{B1}$ and $A_{B2}$ are the amplitudes of $E_{B1}$(t) and $E_{B2}$(t−τ), respectively, and $\varphi_{B1}$ and $\varphi_{B2}$ are initial phases of $E_{B1}$(t) and $E2E_{B2}$(t−τ), respectively.

The multiplexed light generated by the self-delayed homodyne interferometer 150 is interfering light, and the interfering light is transmitted to the interfering light reception unit 160. The interfering light reception unit 160 receives the multiplexed light and generates an interference signal $I_{12}$. The interfering light reception unit 160 includes, for example, a balanced photodiode (PD) 162, an FET amplifier 164, and an analog-to-digital converter (A/D) 166. The multiplexed light transmitted to the interfering light reception unit 160 is input to the balanced PD 162. The balanced PD 162 generates a balance detection signal from the multiplexed light. The balance detection signal is an electrical signal. The balance detection signal is appropriately amplified or subjected to another process by the FET amplifier 164, and then is converted into a digital signal by the A/D 166. Thereby the interference signal $I_{12}$ is obtained. The interference signal $I_{12}$ generated by the interfering light reception unit 160 is transmitted to the BFS acquisition unit 170.

The intensity acquisition unit 141 includes a delay unit 157 and a light reception unit 162. Light transmitted to the intensity acquisition unit 141 is delayed by predetermined time by the delay unit 157, and is transmitted to the light reception unit 161. The light reception unit 161 includes a PD 163, an FET amplifier 165, and an A/D 167. The light transmitted to the light reception unit 161 is converted into an electrical signal by the PD 163, and then is appropriately amplified by the FET amplifier 165. The amplified electrical signal is converted into a digital signal by the A/D 167. Thereby an intensity signal is obtained. The intensity signal generated by the light reception unit 161 is transmitted to the BFS acquisition unit 170.

For example, the BFS acquisition unit 170 may be implemented as a commercially available personal computer equipped with software for achieving functional units to be described later. Alternatively, the BFS acquisition unit 170 may be implemented as a field-programmable gate array (FPGA).

Note that, the interference signal $I_{12}$ generated by the interfering light reception unit 160 is very weak. Therefore, it is necessary for an averaging process unit (to be described later) to perform an averaging process to improve a signal-to-noise ratio (S/N). The averaging process is desirably performed by the FPGA for the sake of speeding up.

The interference signal transmitted from the A/D 166 of the interference signal acquisition unit 140 to the BFS acquisition unit 170 is transmitted to an interference signal averaging process unit 172. The interference signal averaging process unit 172 performs the averaging process on the interference signal, and transmits the interference signal to a Brillouin scattering coefficient elimination unit 176. Here, an expression (4) listed below represents the interference signal $I_{12}$.

$$I_{12} = A_{B1}^2 + A_{B2}^2 + 2A_{B1}A_{B2}\eta_B^2(t)\cos\{2\pi(f_B(t)\tau) + \varnothing_{offset}\}\varnothing_{offset} = \varnothing_{B1} - \varnothing_{B2} \quad (4)$$

In addition, the intensity signal transmitted from the A/D 167 of the intensity acquisition unit 141 to the BFS acquisition unit 170 is transmitted to an intensity signal averaging process unit 173. The intensity signal averaging process unit 173 performs the averaging process on the intensity signal, and transmits the intensity signal to the Brillouin scattering coefficient elimination unit 176.

The Brillouin scattering coefficient elimination unit 176 uses the intensity signal to eliminate a change in the Brillouin scattering coefficient $\eta_B(t)$ included in the interference signal $I_{12}$ represented by the expression (4). As a result, an interference signal represented by an expression (5) listed below is obtained.

$$I_{12} = A_{B1}^2 + A_{B2}^2 + 2A_{B1}A_{B2}\cos\{2\pi(f_B(t)\tau) + \varnothing_{offset}\} \quad (5)$$

The above-listed expression (5) represents that only the change in the Brillouin frequency $f_B(t)$ is output as intensity change.

An expression (6) is obtained by normalizing the above-listed expression (5), and this makes it easier to convert the intensity change to a BFS.

$$I_{a.u.cos} = \frac{1}{2} + \frac{1}{2}\cos(2\pi f_B(t)\tau + \varnothing_{offset}) \quad (6)$$

An expression (7) listed below is obtained by transforming the above-listed expression (6). The BFS is computed by using the expression (7) listed below.

$$BFS = f_B(t) = \frac{\mathrm{acos}(2I_{a.u.\_cos} - 1) - \varnothing_{offset}}{2\pi\tau} \quad (7)$$

As represented by the above-listed expression (7), the frequency range of the BFS is decided on the basis of the delay time $\tau$ and the phase difference $\varphi_{offset}$ between light propagating through the first optical path and light propagating through the second optical path. For example, a BFS value of 0 to 500 MHz is obtained when the delay time $\tau$ is one nanosecond and the phase difference $\varphi_{offset}$ is 0. In addition, a measurement range is set to a range of $-BFS_{offset}$ to $\frac{1}{2}\tau - BFS_{offset}$ when $\varphi_{offset} = 2\pi BFS_{offset}$. When $BFS_{offset}$ is set as described above, it is also possible to measure a negative value.

Here, information regarding $\varphi_{offset}$, amplitudes $A_{B1}$ and $A_{B2}$ are necessary to normalize the above-listed expression (5) to the above-listed expression (6) and compute the BFS by using the above-listed expression (7). However, the self-delayed homodyne sensor does not perform phase comparison calculation. Therefore, it is impossible to estimate the relation between intensity and phase without any change. In addition, the relation between phase and intensity is not constant, but varies depending on an S/N of input Brillouin scattered light, conversion efficiency of the light receiving element, and the like. Therefore, it is impossible to uniquely determine the BFS.

For this, the self-delayed homodyne sensor according to this embodiment performs calibration measurement and calculate the relation between intensity and phase before starting usual measurement.

Figure 3A:
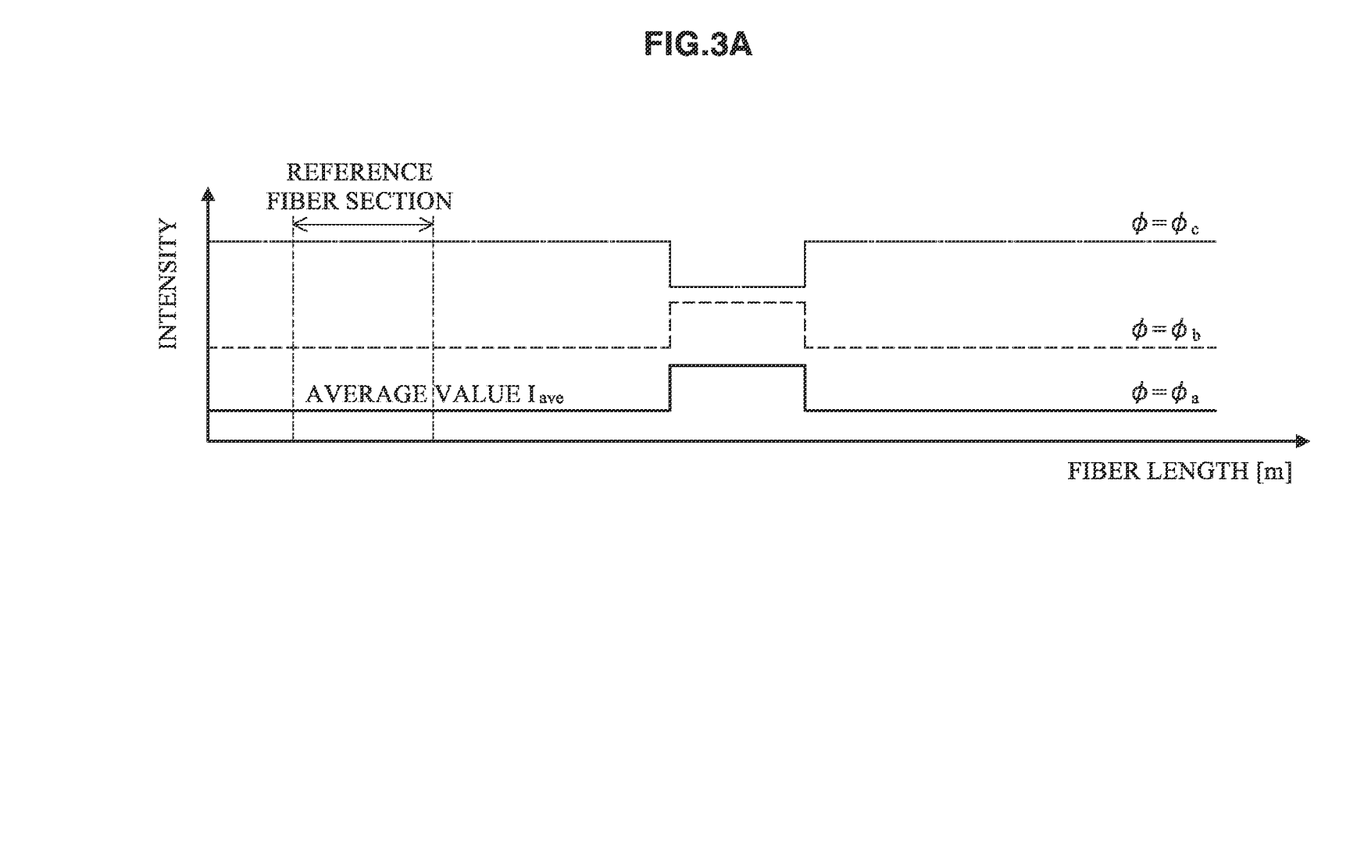
FIG. 3A is a schematic diagram for describing calibration measurement.
Figure 3B:
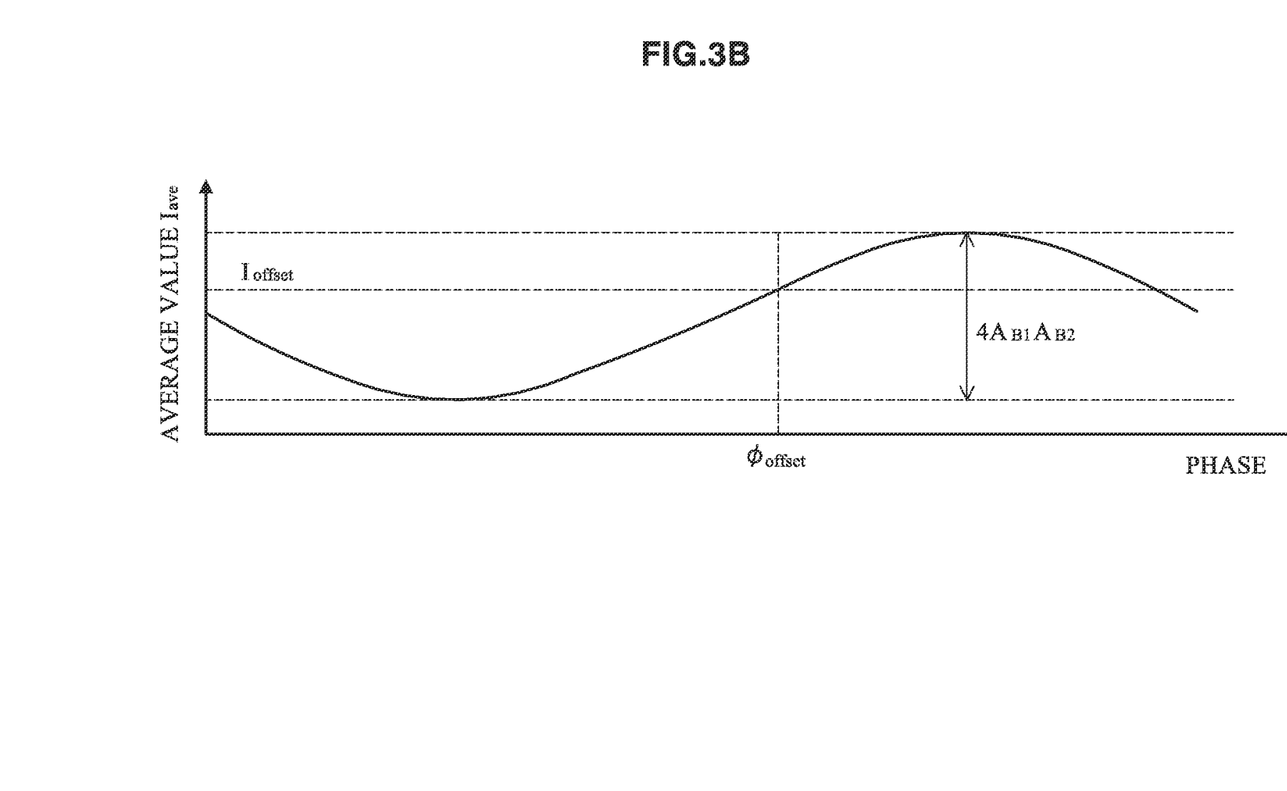
FIG. 3B is a schematic diagram for describing the calibration measurement.
Figure 3C:
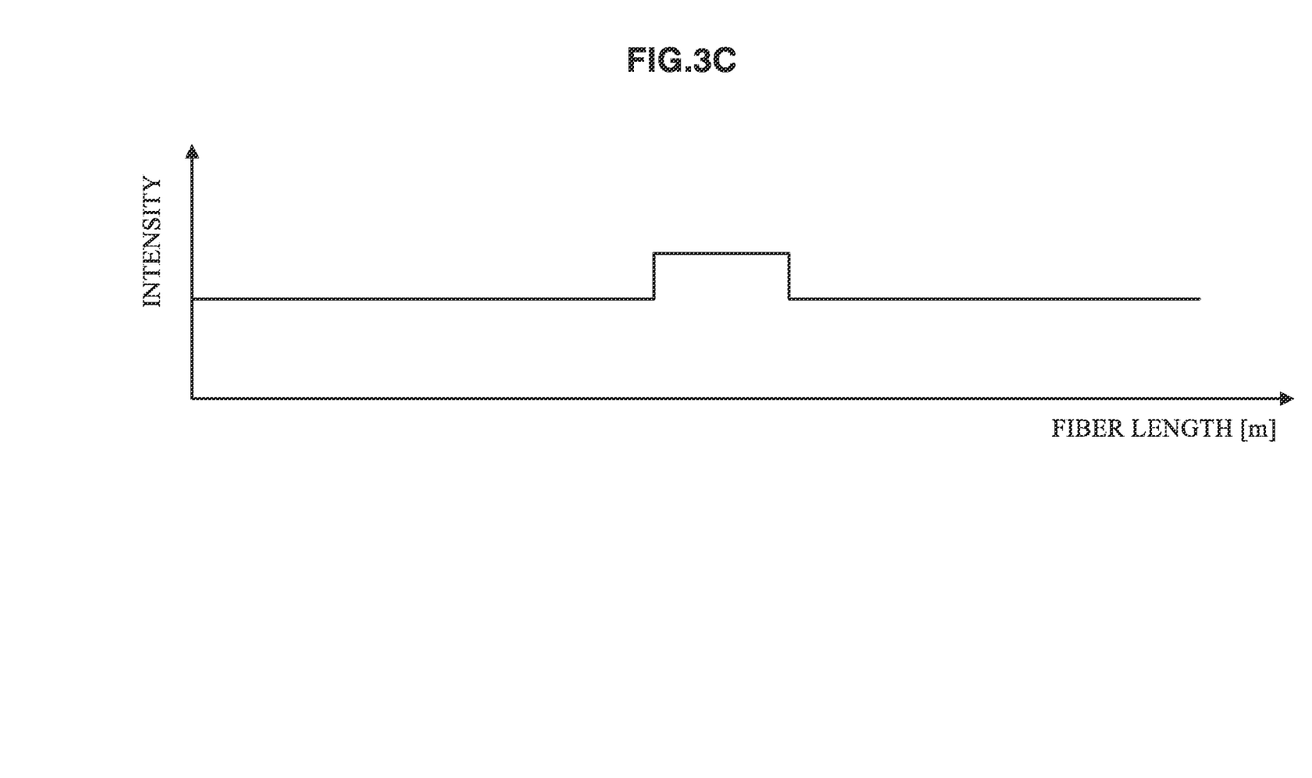
FIG. 3C is a schematic diagram for describing the calibration measurement.

The calibration measurement will be described with reference to FIG. 3A, FIG. 3B, and FIG. 3C. FIG. 3A, FIG. 3B, and FIG. 3C are schematic diagrams for describing the calibration measurement.

In the calibration measurement, the delay unit 156 changes the phase of light propagating through the first optical path from 0 to $2\pi$ in response to a signal from the phase control circuit 142. At this time, waveforms illustrated in FIG. 3A are obtained with regard to respective phase states. FIG. 3A schematically illustrates a case where a phase $\varphi$ is $\varphi_a$, a case where the phase $\varphi$ is $\varphi_b$, and a case where the phase $\varphi$ is $\varphi_c$.

Here, a reference fiber section (hereinafter, also referred to as a reference section) is prepared, and an average value of the interference signal $I_{12}$ subjected to the averaging process is calculated in the respective phase states. As a result, a relation between the phases and the average values $I_{ave}$ of output intensity in the reference section can be acquired as illustrated in FIG. 3B. The amplitudes $A_{B1}$ and $A_{B2}$ can be calculated from a maximum value and a minimum value of the average values $I_{ave}$. In addition, intensity $I_{offset}$ and $\varphi_{offset}$ tailored to a BFS measurement range can be set as initial values since the relation between phases and output intensity are obtained.

For example, the reference section is preferably set to a portion having a length of 10 to 20 meters of the measurement target optical fiber 100, and is preferably housed in a casing of the optical fiber sensor.

In the usual measurement, the BFS is computed by performing normalization using the amplitudes $A_{B1}$ and $A_{B2}$ obtained through the calibration measurement. As a result, distribution of the BFS in the measurement target optical fiber 100 is obtained as illustrated in FIG. 3C.

Note that, the phase in the self-delayed homodyne interferometer constantly varies depending on disturbance or the like. Accordingly, also in the usual measurement, the $BFS_{offset}$ is maintained constant by acquiring an average value $I_{ave}$ in the reference section, calculating a difference between the average value $I_{ave}$ and $I_{offset}$, and performing feedback control over phase.

Configuration Example

Figure 4:
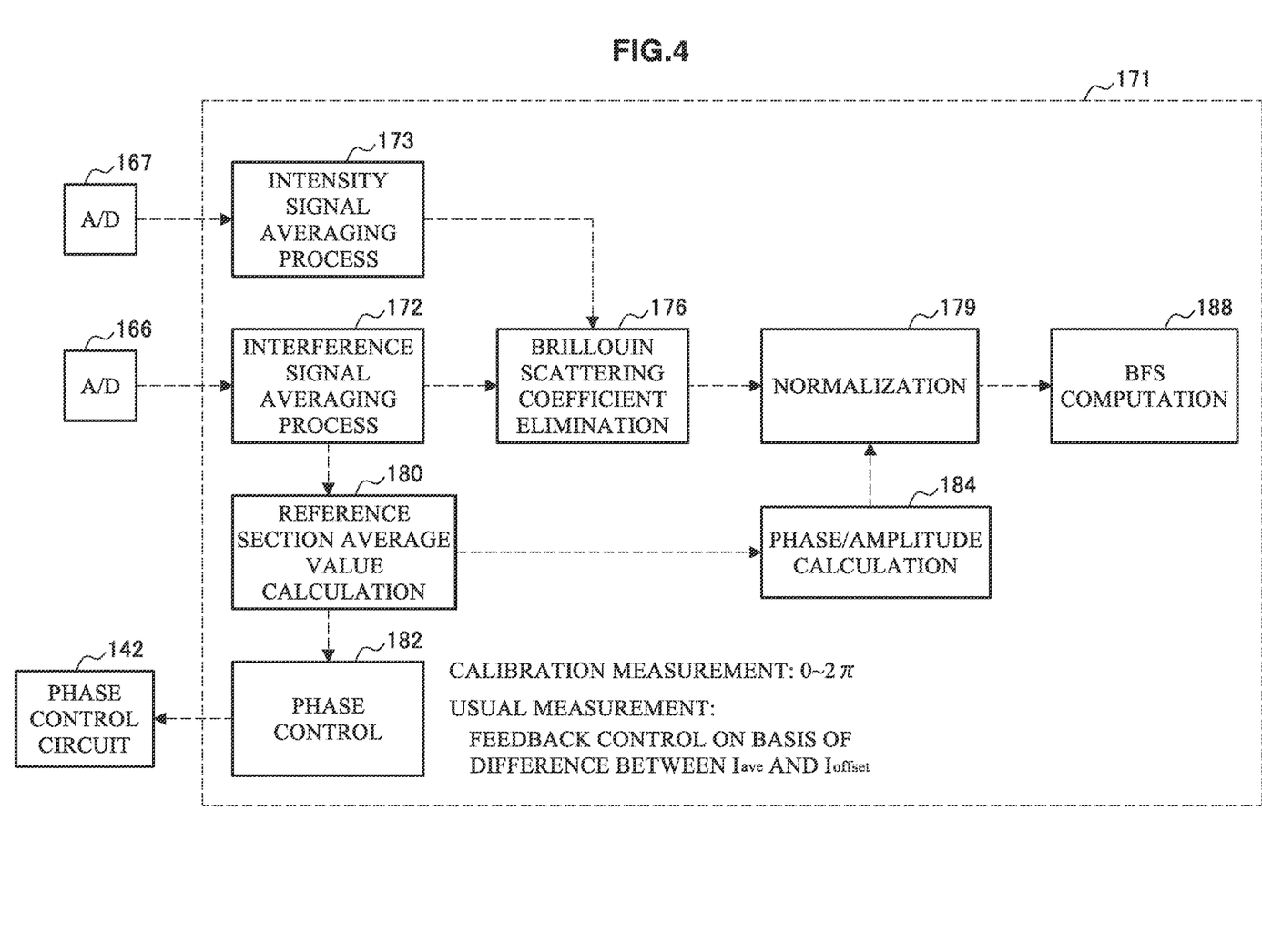
FIG. 4 is a block diagram schematically illustrating a configuration example of a self-delayed homodyne sensor according to the embodiment.

A configuration example and behavior of a self-delayed homodyne sensor according to this embodiment will be described with reference to FIG. 4. FIG. 4 is a diagram schematically illustrating the configuration example of the self-delayed homodyne sensor according to this embodiment. Note that, structural elements other than a BFS acquisition unit are similar to those of the self-delayed homodyne sensor described above with reference to FIG. 1. Accordingly, repeated description and illustration thereof will be omitted.

First, calibration measurement will be described.

An interference signal transmitted from the A/D 166 of the interference signal acquisition unit 140 to a BFS acquisition unit 171 is transmitted to the interference signal averaging process unit 172. The interference signal averaging process unit 172 performs the averaging process on the interference signal to improve an S/N. The interference signal subjected to the averaging process is transmitted to a reference section average value calculation unit 180. The reference section average value calculation unit 180 acquires an average value of the interference signal subjected to the averaging process in the reference section, and transmits the acquired average value to a phase/amplitude calculation unit 184. Subsequently, a phase control unit 182 sends an instruction to the phase control circuit 142 and $\varphi_{offset}$ is swept from 0 to $2\pi$. After $\varphi_{offset}$ is swept from 0 to $2\pi$, the phase/amplitude calculation unit 184 acquires the relation between phase and output intensity illustrated in FIG. 3B, and calculates the amplitudes $A_{B1}$ and $A_{B2}$. The amplitudes $A_{B1}$ and $A_{B2}$ are used for performing normalization in usual measurement. In addition, the phase/amplitude calculation unit 184 sets an initial phase $\varphi_{offset}$ and initial intensity $\varphi_{offset}$ corresponding to $\varphi_{offset}$ on the basis of the relation between phase and output intensity.

Next, the normal measurement will be described.

An interference signal transmitted from the A/D 166 of the interference signal acquisition unit 140 to the BFS acquisition unit 171 is transmitted to the interference signal averaging process unit 172. The interference signal averaging process unit 172 performs the averaging process on the interference signal, and transmits the interference signal to the Brillouin scattering coefficient elimination unit 176.

In addition, an intensity signal transmitted from the A/D 167 of the intensity acquisition unit 141 to the BFS acquisition unit 171 is transmitted to the intensity signal averaging process unit 173. The intensity signal averaging process unit 173 performs the averaging process on the intensity signal, and transmits the intensity signal to the Brillouin scattering coefficient elimination unit 176.

The Brillouin scattering coefficient elimination unit 176 uses the intensity signal to eliminate a change in the Brillouin scattering coefficient $\eta_B(t)$ included in the interference signal $I_{12}$. The above-listed expression (5) is obtained from the above-listed expression (4) through the above-described process.

A normalization unit 179 uses the amplitudes $A_{B1}$ and $A_{B2}$ computed by the phase/amplitude calculation unit 184 through the calibration measurement to normalize the interference signal from which the change in Brillouin scattering coefficient $\eta_B(t)$ is eliminated by the Brillouin scattering coefficient elimination unit 176. The above-listed expression (6) is obtained through the above-described process.

A BFS computation unit 188 computes a BFS from the intensity of the normalized interference signal by using the initial phase $\varphi_{offset}$ on the basis of the above-listed expression (7).

In addition, the interference signal averaging process unit 172 transmits the interference signal subjected to the averaging process to the reference section average value calculation unit 180. In a way similar to the calibration measurement, the reference section average value calculation unit 180 acquires an average value $I_{ave}$ of the interference signal subjected to the averaging process in the reference section. The phase control unit 182 performs so-called feedback control. In the feedback control, the phase control unit 182 sends an instruction to the delay unit 156 via the phase control circuit 142 in such a manner that the average value $I_{ave}$ becomes consistent with the initial intensity $I_{offset}$.

The BFS has dependency on strain and temperature. Therefore, strain and temperature of the measurement target optical fiber 100 can be acquired by using any suitable conventionally well-known technology after the BFS is decided. In other words, the optical fiber sensor according to this embodiment is applicable to a distributed strain/temperature sensor, and the Brillouin frequency shift measurement method according to this embodiment is applicable to a strain/temperature measurement method.

As described above, when using the optical fiber sensor and the Brillouin frequency shift measurement method according to this embodiment, it is possible to uniquely determine the BFS by acquiring a relation between a phase of light propagating through one of the optical paths in the interferometer and average intensity in a reference section.

In addition, even if a relation between phase and intensity of an intensity signal corresponding to a phase difference between the two optical paths in the interferometer varies depending on the S/N of input Brillouin scattered light, conversion efficiency of a light receiving element, and the like, it is possible to compute a correct BFS by performing the feedback control over the phase of the scattered light in such a manner that the average intensity in the reference section becomes consistent with the initial intensity $I_{offset}$ corresponding to the initial phase $\varphi_{offset}$.

Although details of the preferable embodiments of the present invention have been described above with reference to the appended drawings, the present invention is not limited thereto. It will be clear to a person of ordinary skill in the art of the present invention that various modifications and improvements may be obtained within the scope of the technical idea recited by the scope of the appended claims, and it should be understood that they will naturally come under the technical scope of the present invention.

What is claimed is:

1. An optical fiber sensor comprising:
    a light source unit configured to generate probe light;
    a splitting unit configured to split Brillouin backscattered light into two scattered light beams, the Brillouin backscattered light occurring in an optical fiber to be measured with the probe light;
    an interference signal acquisition unit configured to receive one of the two scattered light beams split by the splitting unit, and generate an interference signal through self-delayed homodyne interference;
    an intensity acquisition unit configured to receive another one of the two scattered light beams split by the splitting unit, and generate an intensity signal indicating intensity of the scattered light; and
    a Brillouin frequency shift acquisition unit configured to acquire a Brillouin frequency shift amount from the interference signal and the intensity signal,
    wherein the interference signal acquisition unit includes a self-delayed homodyne interferometer having
        a splitting unit configured to split the received scattered light beam into two branches including a first optical path and a second optical path, a delay unit provided in the first optical path and configured to change a phase of the scattered light in response to an instruction from the Brillouin frequency shift acquisition unit, and a multiplexer unit configured to multiplex light received through the first optical path and light received through the second optical path to generate interfering light, and an interfering light reception unit configured to convert the interfering light into an electrical signal to generate an interference signal, and the Brillouin frequency shift acquisition unit includes a reference section average value calculation unit configured to acquire average intensity of the interference signal in a preset reference section, a phase control unit configured to control the delay unit in such a manner that the phase of the scattered light propagating through the first optical path is swept from 0 to $2\pi$, a Brillouin scattering coefficient elimination unit configured to eliminate a Brillouin scattering coefficient from the interference signal by using the intensity signal, a phase/amplitude calculation unit configured to acquire a relation between the phase and average intensity $I_{ave}$ of the interference signal in the reference section from the average intensity $I_{ave}$ obtained through the phase sweep from 0 to $2\pi$, and acquire an initial phase $\varphi_{offset}$ that defines a measurement range of a Brillouin frequency shift and amplitude of the interference signal on a basis of the relation, a normalization unit configured to use the amplitude of the interference signal to normalize the interference signal from which the Brillouin scattering coefficient is eliminated, and a Brillouin frequency shift computation unit configured to compute the Brillouin frequency shift by using the normalized interference signal.

2. The optical fiber sensor according to claim 1, wherein the phase control unit is capable of controlling the phase obtained in the delay unit in such a manner that the average intensity $I_{ave}$ in the reference section becomes consistent with initial intensity $I_{offset}$ corresponding to the initial phase $\varphi_{offset}$.

3. A Brillouin frequency shift measurement method comprising:

generating probe light;

splitting Brillouin backscattered light into two scattered light beams, the Brillouin backscattered light occurring in an optical fiber to be measured with the probe light;

splitting one of the two split scattered light beams into two branches including a first optical path and a second optical path;

delaying scattered light propagating through the first optical path;

multiplexing the scattered light propagating through the first optical path and scattered light propagating through the second optical path to generate interfering light;

performing photoelectric conversion on the interfering light to generate an interference signal that is an electrical signal;

acquiring an intensity signal indicating scattered light intensity from another one of the two scattered light beams obtained by splitting the Brillouin backscattered light; and acquiring a Brillouin frequency shift from the interference signal and the intensity signal, wherein calibration measurement is performed before usual measurement, and the calibration measurement includes acquiring a relation between phase and average intensity $I_{ave}$ of the interference signal in a reference section from the average intensity $I_{ave}$ obtained through phase sweep from 0 to $2\pi$, acquiring an initial phase $\varphi_{offset}$ that defines a measurement range of a Brillouin frequency shift and amplitude of the interference signal on a basis of the relation, and setting a phase obtained in a delay unit to the initial phase $\varphi_{offset}$.

4. The Brillouin frequency shift measurement method according to claim 3, wherein, in the usual measurement, a phase of the scattered light propagating through the first optical path is controlled in such a manner that the average intensity in the reference section becomes consistent with initial intensity $I_{offset}$ corresponding to the initial phase $\varphi_{offset}$.

* * * * *

UNITED STATES PATENT AND TRADEMARK OFFICE
CERTIFICATE OF CORRECTION

| | | |
|---|---|---|
| PATENT NO. | : 11,796,352 B2 | Page 1 of 1 |
| APPLICATION NO. | : 17/967321 | |
| DATED | : October 24, 2023 | |
| INVENTOR(S) | : Kengo Koizumi | |

It is certified that error appears in the above-identified patent and that said Letters Patent is hereby corrected as shown below:

On the Title Page

Item (30) Foreign Application Priority Data should read:
March 10, 2022 (JP)..................2022036860

Signed and Sealed this
Twenty-fifth Day of June, 2024

Katherine Kelly Vidal
*Director of the United States Patent and Trademark Office*